United States Patent
Gudeman et al.

[11] Patent Number: 5,949,612
[45] Date of Patent: Sep. 7, 1999

[54] LOW FRICTION SLIDING HARD DISK DRIVE SYSTEM

[75] Inventors: Christopher S. Gudeman, Los Gatos; Michael H. Azarian; Michael A. Baldwinson, both of Cupertino; Keith R. Berding, San Jose; Kaynam Chun, San Francisco; Garrett A. Garrettson, Los Altos Hills; Harold J. Hamilton, Santa Clara; Robert D. Hempstead, Los Gatos; Dimitre A. Latev, San Jose; Mark A. Lauer, Pleasanton, all of Calif.

[73] Assignee: Censtor Corp., San Jose, Calif.

[21] Appl. No.: 08/515,140

[22] Filed: Aug. 15, 1995

Related U.S. Application Data

[63] Continuation-in-part of application No. 08/408,036, Mar. 21, 1995.

[51] Int. Cl.$^6$ ................................................. G11B 05/12
[52] U.S. Cl. .................... 360/97.01; 360/102; 360/103; 360/122; 360/135; 428/694 TF; 428/694 TR; 428/65.4; 428/900
[58] Field of Search ................................. 428/65.3, 65.4, 428/65.5, 141, 156, 694 TP, 694 TR, 694 TS, 900, 694 SG, 694 TF; 360/135, 97.01, 102, 103, 122

[56] References Cited

U.S. PATENT DOCUMENTS

| | | | |
|---|---|---|---|
| 4,540,618 | 9/1985 | Suzuki et al. | 428/141 |
| 4,898,774 | 2/1990 | Yamashita et al. | 428/336 |
| 4,901,185 | 2/1990 | Kubo et al. | 360/104 |
| 4,926,274 | 5/1990 | Saitoh et al. | 360/102 |
| 4,997,696 | 3/1991 | Kamada et al. | 428/141 |
| 5,030,494 | 7/1991 | Ahlert et al. | 428/65.3 |
| 5,070,425 | 12/1991 | Inomuchi | 360/135 |
| 5,073,785 | 12/1991 | Jansen et al. | 346/1.1 |
| 5,080,948 | 1/1992 | Morita et al. | 428/65.3 |
| 5,119,258 | 6/1992 | Tsai et al. | 360/135 |

(List continued on next page.)

FOREIGN PATENT DOCUMENTS 1149217  6/1989  Japan.

OTHER PUBLICATIONS

C. Mathew Mate, Application of Disjoining and Capillary Pressure to Liquid Lubricant Films in Magnetic Recording, *Journal of Applied Physics*, 72 (7), Oct. 1, 1992, pp. 3084–3090.

*Primary Examiner*—Stevan A. Resan
*Attorney, Agent, or Firm*—Mark Lauer

[57] ABSTRACT

A operationally contacting hard disk drive system has reduced friction due to lower capillary adhesion between the disk surface and a transducer in a substantially continuous sliding relationship with the surface. The disk surface has an adhesion-reducing texture that includes a microscopic RMS roughness in a range between about 1.5 and 5.5 nanometers, or a number of asperities having a mean plane to peak height in a range between about 6 and 50 nanometers. The roughness may increase in a radially graded fashion to compensate for the increased linear velocity and concomitant frictional power loss near the outer diameter of the disk. It is important that the uppermost reaches of the textured surface are smooth but not flat in order to obtain lasting low friction operation, which is accomplished by constructing the surface with a highest approximately one percent having an average radius of curvature in a range between 2 microns and 100 microns. An area of the slider in apparent contact with the disk surface is preferably less than 1000 square microns, and a ratio between this nominal area and the mean to peak height is less than 0.3 meters. The slider may also include a substantial thickness of partially wetting material in contact with the disk, or may alternatively be textured with deep grooves or materials having differing wear rates, in order to provide reduced frictional adhesion despite wear of the slider.

19 Claims, 6 Drawing Sheets

U.S. PATENT DOCUMENTS

| | | | |
|---|---|---|---|
| 5,139,849 | 8/1992 | Takagi et al. | 428/694 SG |
| 5,166,006 | 11/1992 | Lat et al. | 428/612 |
| 5,202,810 | 4/1993 | Nakamura et al. | 360/135 |
| 5,210,673 | 5/1993 | Ito et al. . | |
| 5,225,955 | 7/1993 | Ito et al. | 360/135 |
| 5,232,570 | 8/1993 | Haines et al. | 204/192.16 |
| 5,235,483 | 8/1993 | Hayakawa et al. | 360/103 |
| 5,277,960 | 1/1994 | Tsuya et al. | 428/694 SG |
| 5,285,343 | 2/1994 | Tanaka et al. | 361/131 |
| 5,305,165 | 4/1994 | Brezoczky et al. | 360/103 |
| 5,345,353 | 9/1994 | Krantz et al. | 360/103 |
| 5,353,182 | 10/1994 | Nakamura et al. | 360/104 |
| 5,388,020 | 2/1995 | Nakamura et al. | 360/135 |
| 5,416,656 | 5/1995 | Fukuda et al. | 360/103 |
| 5,526,204 | 6/1996 | French et al. | 360/97.02 |
| 5,549,954 | 8/1996 | Otsuka et al. | 428/65.3 |
| 5,734,519 | 3/1998 | Fontana, Jr. et al. | 360/97.01 |

LOW FRICTION SLIDING HARD DISK DRIVE SYSTEM

RELATED APPLICATIONS

This application is a continuation-in-part of U.S. patent application Ser. No. 08/408,036 entitled, CONTACT INTERFACE, SYSTEM AND MEDIUM IN ELECTROMAGNETIC, READ/WRITE, RIGID-RECORDING-MEDIA ENVIRONMENT, filed Mar. 21, 1995.

TECHNICAL FIELD

The present invention involves disk drive storage systems, and in particular involves an interface between a disk surface and an electromagnetic head sliding on the surface.

BACKGROUND OF THE INVENTION

Hard disk drives have traditionally employed electromagnetic transducers that are spaced from a rapidly spinning, rigid disk surface by a thin layer of air that moves with the disk. Such an air layer helps to avoid damage between the rapidly spinning disk and the essentially stationary transducer, which is constructed with a large, aerodynamic "slider" designed to "fly" over the surface, buoyed by the moving air layer. The air layer also acts as a bearing which results in negligible friction between the transducer and the disk. Unfortunately, the air layer creates an additional space between the transducer and the magnetic medium layer of the disk that is used to store information. This spacing lowers the resolution with which data can be stored and retrieved. In an attempt to lower the spacing loss and thereby increase resolution, transducer flying heights have generally decreased over many years in the magnetic recording industry. Lowering the flying height, however, encounters a countervailing problem of catastrophic head crash that occurs when the transducer impacts the rapidly spinning disk.

In recent years the conflict between flying height and head crash has been addressed by designing the drive system so that the head supporting structure is run in continuous sliding contact with the disk, thus potentially reducing the problem of impact between the head and disk that results in head crash. Any perturbation that causes separation between the head and disk, however, can result in a crash when the two recontact. Such a perturbation can be due to a shock to the drive, such as would occur from accidental bumping of the drive or its support, or can be due to the presence on the disk surface of an asperity or debris. Note that in either situation, a potentially destructive impact can occur due to the initial perturbation, instead of or in addition to the crash upon recontact.

In U.S. Pat. No. 5,041,932, Hamilton discloses a transducer that operates in contact with a rigid disk surface without destructive head crash, essentially by designing the mechanical and inertial characteristics of the transducer to conform to the rapidly spinning rigid disk without damage to the disk or transducer. A different approach for a hard disk drive system for allowing operational contact between the head and the disk is proposed in U.S. Pat. No. 4,819,091 to Brezoczky et al., which states that nondestructive wear may be possible provided that the slider material is so much more thermally conductive than the disk that the slider surface is maintained at a lower temperature than the much larger disk surface as the slider rubs on the disk. And U.S. Pat. No. 4,901,185 to Kubo et al. teaches operational contact between a disk and a slider having a head appended and spaced from contacting the disk to avoid damage to the head.

Nondestructive operation of a hard drive system having a transducer in contact with a disk raises other issues. Long term wear of the slider and disk surface must be held to tolerable levels, as discussed in the above-referenced co-pending U.S. Pat. Application for CONTACT INTERFACE, SYSTEM AND MEDIUM IN ELECTROMAGNETIC, READ/WRITE, RIGID-RECORDING-MEDIA ENVIRONMENT. Vibration of the transducer caused by sliding must also be minimized, to avoid damage to the transducer or disk and signal communication problems. Friction should also be minimized, especially for disk drives employed with portable computers or other applications requiring low power consumption. The above problems of wear, vibration and friction would appear to be exacerbated by roughness of the surface of the disk or slider.

The consideration of friction dates back at least to Leonardo da Vinci, and is still not completely understood. For example, drawings from one of Leonardo's notebooks show the concept that, for a given object and associated surface, the frictional force is independent of the area of the body in contact with the surface, which has come to be known as Amontons' First Law. Amontons' Second Law states that the frictional force is proportional to the applied normal force of the object on the surface. The two laws are evident, for example, when a block having faces with differing surface areas slides first on one face and then the other. The frictional force, like the applied load or weight, remains the same despite the change in the area of contact.

A distinction is generally made between static adhesion, termed stiction, and dynamic friction, which is commonly manifested in the fact that it typically takes more force to start a body sliding relative to a surface than it takes to keep that body sliding on the surface. While friction is not a problem with conventional flying heads, stiction that occurs when the disk stops spinning and the flying head comes to rest, known as contact start/stop (CSS), can cripple a drive. In order to allow sliders to fly as close as possible to the disk surface, both the slider and disk surfaces must be made extremely smooth, which results in unacceptably high levels of stiction when the slider comes to rest on the disk surface.

To reduce stiction Nakamura et al., in U.S. Pat. No. 5,202,810, disclose a disk substrate having generally concentric grooves formed in a disk substrate so that a surface depressed by a loaded slider during CSS has a bearing ratio of between 0.1% and 10%. Alternatively, Nakamura et al. disclose, in U.S. Pat. No. 5,388,020, selective etching of a polished mirror substrate to form a plurality of plateaus having a similar bearing ratio.

In U.S. Pat. No. 5,119,258, Tsai et al. teaches a disk designed to have low stiction due to plasma etching of a glass disk substrate that produces a micro-roughened substrate surface which, according to interference measurements, results in an adjacent disk surface having a generally sinusoidal height variation that crosses a mean height between 22 and 44 times per millimeter (mm). In U.S. Pat. No. 5,166,006, Lal et al. employ similar substrate etching and include an inner zone having increased roughness for stiction reduction. Rather than etching the disk substrate, U.S. Pat. No. 5,070,425 to Inumochi teaches grinding the substrate to form groups of arcuate grooves that cross each other at angles preferably around 90° in order to reduce the tendency of the slider and disk to lock together during CSS. U.S. Pat. No. 5,225,955 to Ito et al. employs similar grooves that intersect at shallower angles, again for CSS stiction reduction.

In U.S. Pat. No. 5,305,165, Brezoczky et al. propose a system in which the slider material creates a triboelectrically generated electrostatic attraction between the slider and the disk. The slider can then be negatively loaded (i.e., pushed away from the disk) in order to lower friction. The situation appears unstable, however, as both the triboelectric generation and the electrostatic attraction decrease as the slider moves away from the disk, encouraged by the negative loading.

An object of the current invention is to reduce friction during operation of a transducer in continuous sliding contact with a rigid disk surface, especially with regard to a reduction in power consumption and vibration of the transducer caused by sliding on the disk. Importantly, it is desired that this object is achieved in a manner that does not clash with other constraints, such as the minimization of wear and head-to-medium spacing.

SUMMARY OF THE INVENTION

The above object is achieved in a hard disk drive system that reduces friction by decreasing capillary adhesion between the disk and head. In an essentially continuously contacting, sliding head environment, we have found that microscopically rough rather than smooth interface surfaces offer reduced friction and vibration. The need for a microscopically rough disk surface can be reconciled with a conflicting requirement of minimal wear of the sliding head by ensuring that the upper reaches of the microscopically rough disk surface topography are smooth but not flat, and by an appropriate choice of materials for the head and disk. Specifically, a disk surface of the present invention providing low friction as well as low head wear has microscopic surface protrusions with summits that have a radius of curvature in a specified range of many microns ($\mu$m), with recesses spaced between the protrusions having a depth specified in a range of many nanometers (nm).

The spacing between the head and a magnetic medium layer of the disk caused by this microscopic roughness can be minimized by having recesses located between the protrusions which are generally flat and of a minimal depth below the tops of the adjacent protrusions to ensure sufficient friction reduction, with the topography of the medium layer conforming closely to that of the surface, so that a hard protective layer disposed atop the medium and forming the disk surface has an extremely small and essentially uniform thickness. Thus a preferred embodiment of a rigid contact recording disk surface of the present invention that minimizes friction, head wear and spacing loss is characterized by microscopic mounds having generally coplanar tops and interspaced, generally flat recesses, the mounds having a height and roundness sufficient to minimize the capillary adhesion without unduly increasing spacing loss.

We have also found, in the pursuit of decreasing capillary adhesion, that friction can be kept within tolerable levels by tailoring the disk surface to have a graded roughness that generally increases with distance from the center of the disk, offering a corresponding radial decrease in the level of friction caused by capillary adhesion. Since power lost to friction is generally proportional to velocity, the higher disk velocity encountered near the outer diameter of the disk is mollified by lower friction in that area, while the higher velocity at the outer tracks offers magnetic resolution and amplitude advantages that make up for any spacing loss caused by the increased roughness. An increase in roughness can be accomplished with a higher peak-to-valley or root-mean-squared (RMS) roughness, although a similar decrease in friction may be accomplished by increased lateral spacing between protrusions.

In contrast to Amontons' first law, we have also found that reducing the nominal area of the transducer which slides on the disk surface offers a substantial reduction in dynamic friction. Unlike conventional flying sliders which utilize a large air bearing surface in order to be lifted from the disk by the thin layer of air that moves with the disk, the transducers of the present invention are of reduced size and are fabricated to have at least one projection or pad upon which the transducer slides in order to avoid lifting by that air layer. This allows a much smaller load to be employed to hold the much lighter transducer adjacent to the surface and lowers the nominal area in contact with the surface dramatically as compared with a conventional slider at rest. The applied load is small enough that it may be comparable to the load produced by capillary adhesion which, for a given applied load, varies dramatically with the area of contact. This realization of the dependence of friction on area of contact has resulted in constructing transducers having a further reduced pad size for sliding on the disk surface.

Since reducing the capillary adhesive source of friction can be achieved with a contact disk drive system having either reduced pad size or increased disk surface roughness, a tolerable friction level can be achieved via a sliding scale relating pad contact area and disk surface roughness. In other words, a ratio of pad area to disk roughness corresponds generally to interface friction, so that for a permissible level of friction a larger pad size can be tolerated with a rougher surface or, conversely, a smoother disk can be tolerated with a smaller pad size. The desire to reduce capillary adhesion has also led to the construction of slider pads from materials having reduced wetting characteristics. Since these structures must tolerate some wear over the lifetime of the drive, it is important that the pads have more than a surface coating of partially wetting material. Overall, reduction of adhesive friction has been accomplished in the present invention by novel disk surfaces, sliding structures and interface relationships that, alone or in combination, satisfy the goal of maintaining a tolerable friction level in a continuously sliding hard disk drive system.

DESCRIPTION OF THE PREFERRED EMBODIMENTS

Figure 1:
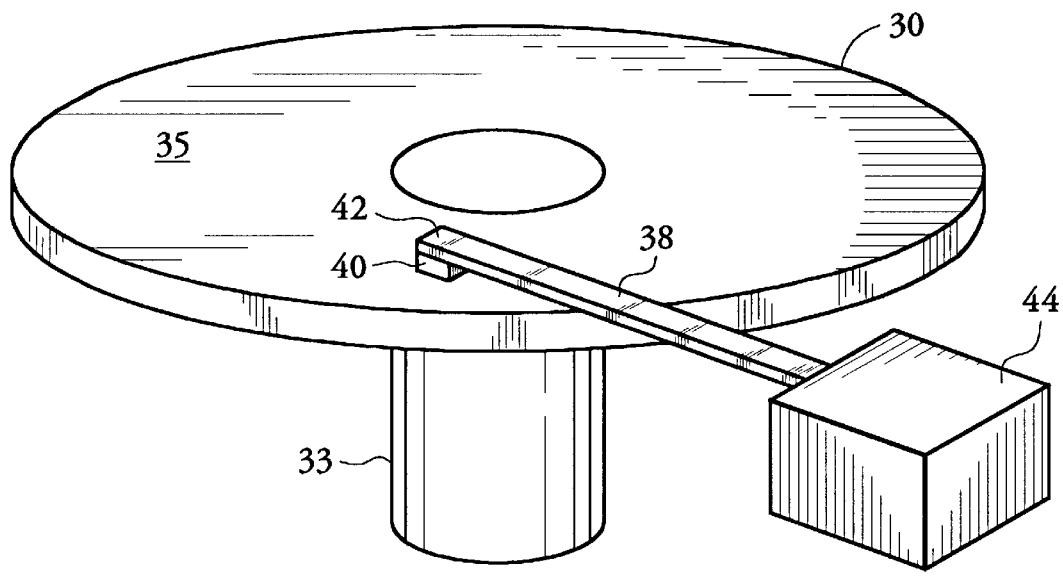
FIG. 1 is a simple plan view of a contact disk drive system of the present invention.

Referring now to FIG. 1, a simplified plan view of an information storage system of the present invention has a rigid recording disk 30 connected to a motor 33 for rotating the disk, as is conventional for hard disk drive systems. Extending over a surface 35 of the disk 30 is an elongated beam 38 which holds an integrated magnetic head and slider structure (simply termed a "slider" 40) at a free end 42 of the beam. The beam 38 is mounted to an actuator 44 distal to the free end 42, the mount pivoting to allow the slider 40 to access different recording tracks of the disk 30. For brevity, a number of elements have been left out of the simplified description and drawing of FIG. 1, the reader being invited instead to explore the following documents, the full disclosure of each being hereby incorporated by reference:

(a) U.S. Pat. No. 4,751,598, issued Jun. 14, 1988;
(b) U.S. Pat. No. 4,860,139, issued Aug. 22, 1989;
(c) U.S. Pat. No. 5,041,932, issued Aug. 20, 1991;
(d) U.S. Pat. No. 5,073,242, issued Dec. 17, 1991;
(e) U.S. Pat. No. 5,111,351, issued May 5, 1992;
(f) U.S. Pat. No. 5,163,218, issued Nov. 1992;
(g) U.S. Pat. No. 5,174,012, issued Dec. 29, 1992;
(h) U.S. Pat. No. 5,063,712, issued Nov. 12, 1991;
(i) U.S. patent application Ser. No. 08/191,967, filed Feb. 4, 1994;
(j) U.S. patent application Ser. No. 07/992,886, filed Dec. 14, 1992;
(k) U.S. patent application Ser. No. 07/990,005, filed Dec. 10, 1992;
(l) U.S. patent application Ser. No. 07/989,170, filed Dec. 10, 1992;
(m) U.S. patent application Ser. No. 07/806,577, filed Dec. 21, 1991;
(n) U.S. patent application Ser. No. 07/966,095, filed Oct. 22, 1992;
(o) U.S. patent application Ser. No. 08/011,890, filed Feb. 1, 1993;
(p) U.S. patent application Ser. No. 08/338,394, filed Nov. 14, 1994;
(q) U.S. patent application Ser. No. 08/408,036, filed Mar. 21, 1995

Many of the challenges relating to contact hard disk drive systems have been addressed in the above listed documents, while the maintenance of friction within acceptable levels is the general subject of the current invention.

Figure 2:
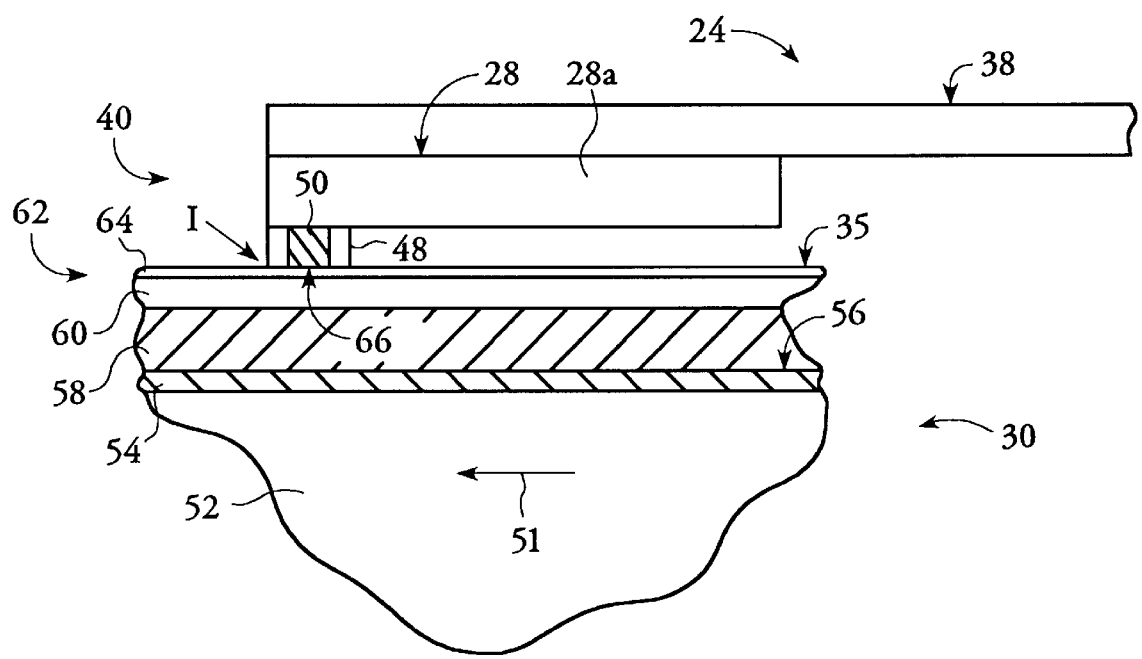
FIG. 2 is a fragmentary cross-sectional view of a frictional interface between a slider and a disk surface.

FIG. 2 shows an interface I between the disk 30 and slider 40 of an embodiment having a single contact pad 48 containing a magnetic pole structure 50. The disk 30 is rotating relative to the slider 40 so that at the interface area the disk travels in a direction shown by arrow 51, which is generally along the elongated direction of the beam 38. The disk includes a self-supporting substrate 52, which may be formed of a variety of materials including aluminum, glass or glass ceramic composite, the choice of substrate depending in part on the desired surface 35 topography. Atop the substrate 52 is a thin, typically metallic underlayer 54, which may be formed of a nickel alloy approximately 10 $\mu$m in thickness. The texture of this underlayer 54, not necessarily to scale, on a surface 56 that is distal to the substrate 52 is important to the texture of the disk surface 35, as the underlayer surface 56 is coated with at least one magnetic medium layer 58, and possibly a seed layer, not shown, and then a hard protective coating 60, both of which are formed with textures substantially reflecting that of the underlayer surface 56.

The layer or layers disposed atop the substrate 52 and including the medium layer 58 and surface 35 are generally referred to as a magnetic recording surface 62, and an identical recording surface to that being described is typically constructed on an opposite surface of the disk 30, not shown. As will be described below, in certain embodiments it is preferable for the medium layer 58 to be formed directly atop the substrate 52, in which case the substrate texture may be substantially duplicated in the disk surface 35. In other embodiments an array of discrete bumps or asperities, not apparent in this figure, may be disposed atop the substrate instead of an underlayer, over which the medium 58 and then overcoat 60 are formed and thereby provided with a desired texture for the disk surface 35.

A lubricant 64 is preferably disposed on the hard surface 35, upon which the slider 40 travels. Although the lubricant 64 is shown in this figure as completely filling an exaggerated space between a bottom surface 66 of the slider 40 and the disk surface 35, it will be seen below that for reduction of friction a reduction of the area of the slider surface 66 and disk surface 35 which are in direct molecular communication across the lubricant 64 is important. The interface I, and in particular the region including opposing surfaces 35 and 66 and the lubricant 64 contained therein is of central concern to the present invention. Having so far provided a general description of the context in which the present invention was made, it is now instructive to look at the causes and consequences of friction in this environment.

The problem of friction in a contact information storage and retrieval system is manifested in two dominant ways: (1) power consumption; and (2) head vibration. Head vibration imparts noise and other deleterious effects, and depends in part on a number of variables independent of the interface, such as mechanical resonances of slider 40 and the beam 38. Holding other variables constant, however, such vibration is believed to generally increase with friction. It is particularly important in minimizing such vibration that changes in frictional force are not periodic with a frequency near a resonance frequency of the slider 40 or beam 38, such as can occur if the slider intermittently contacts the disk 30, or rocks or tilts during sliding. Moreover, vibration due to friction may present a problem in disk drive systems for which power consumption is not a concern. Power consumption is typically easier to quantify than vibration and so will be discussed in more detail, with the understanding that reducing friction generally reduces both power consumption and head vibration.

To appreciate the problem of power consumption consider a slider-disk interface I in which the frictional force ($F_f$) that occurs when the disk is rotated with the slider in contact with the disk is assumed to be, for instance, 1 gram (1 g=0.001 kg×9.8 m/sec$^2$=0.01 newton). The power transfer at the interface I (interface power consumption; P) due to friction can be estimated using the formula: P=$F_f$v, where v is the linear velocity of the disk surface 35 relative to the slider 40. This power is generally lost to heat, sound, vibrations and material degradation at the interface I. For example, with a linear velocity of 10 m/sec, which occurs near an outer diameter (OD) of a 48 mm disk rotating at 4400 rpm, the power required to rotate the disk against a 1 g friction force $F_f$ is 0.1 Joule/sec or 100 milliwatts (mW). This formula assumes that the efficiency of the motor 33 is 100%. Generally motors are approximately 50% efficient, and furthermore disk drives seldom have one single slider 40 and one single disk. Thus for a real system consisting of two disks with four sliders and a motor having a 50% efficiency, the total power consumption of the system is 800 mW. A disk drive manufacturer faces power consumption constraints for small form factor disk drives which are used in battery powered computers such as laptop and hand held systems, resulting in a power allocation to the disk drive that is typically 500 to 1000 mW. For these systems at least, the power consumption due to interface friction should be a small fraction of the 800 mW derived in the example above.

Figure 3:
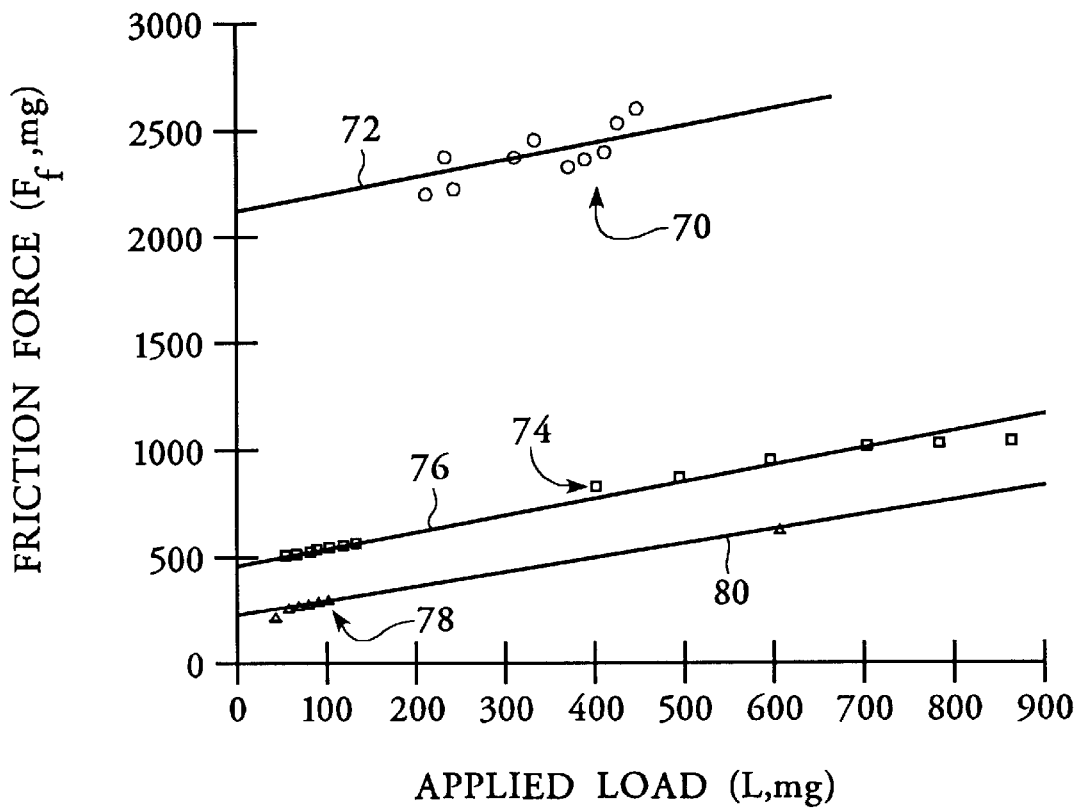
FIG. 3 is a plot of frictional force versus applied load for sliders having a different nominal area of contact with the disk surface.

The magnitude of the sliding friction force $F_f$ encountered at various hard disk drive interfaces has been studied, and data that has been recorded for a smooth disk surface 35 is plotted in FIG. 3. The measured friction force $F_f$ is shown in that figure as a function of the applied head load force (L), both of which are described, as is conventional in the disk drive industry, in units of milligrams (mg), which can be converted to units of newtons (N) by multiplying the numbers quoted here by the factor 9.8×0.000001 (which is approximately equal to 0.00001). The open circles 70 indicate friction $F_f$ versus load L data points measured using a slider 40 having three square 40 μm by 40 μm contact wear pads 48 on a disk 30 with a smooth surface 35. The total pad 48 area that is in apparent or nominal contact with the disk for these data points is thus 4800 μm$^2$, or 0.0048 mm$^2$, and the data points 70 can be extrapolated to create curve 72. The open squares 74 are data points observed for a slider 40 having three 19 μm diameter round pads 48, which are extrapolated to form curve 76, while the open triangles 78 are frictional observations for a slider 40 with 12 μm by 12 μm square pads 48, which lie substantially along curve 80. These latter two sliders 40 are also in contact with a standard smooth disk available from Censtor Corp., 530 Race Street, San Jose, Calif. 95126, and have apparent areas of contact of 850 μm$^2$ and 430 μm$^2$, respectively. It is important in making such friction measurements to ensure that the slider 40 is not initially held to the disk 30 by stiction, which would skew the data.

Several things can be learned from these plots. First, note that the friction force depends upon the pad 48 size or apparent area of contact. In other words, the curves 72, 76 and 80 violate Amontons' First Law, as they show that the friction force $F_f$ is dependent upon pad 48 size, in contravention of the rule that, for a given surface and normal force (applied load L), the frictional force is independent of the apparent area of contact. For every level of applied load L, the friction force $F_f$ measured is higher for a larger area of contact as represented by larger pad 48 size. This can perhaps be seen most clearly for the case in which the applied load L is zero, as each of these curves has a different zero-applied-load intercept, which is dependent upon the total pad 48 area such that increasing pad area results in an increased intercept.

Second, note that the dependence of each of these curves on applied load is similar, with a slope of roughly 0.6 mg $F_f$/mg L. As evidenced by the different zero-applied-load intercepts, however, the coefficient of friction, which is defined as the ratio of the friction force $F_f$ to the applied load L, is not constant. This violates Amontons' Second Law, which predicts that the friction force $F_f$ is proportional to the applied normal load L, or stated differently, that the coefficient of friction is constant for a given interface. It appears from the figure that a certain amount of friction, which will be termed zero-applied-load friction and which varies depending at least on the nominal area of contact, is present at all applied load levels so that after subtraction of this zero-applied-load friction the amount of friction force is proportional to applied load L.

Note also that the level of friction observed under these conditions with the various pad 48 sizes is on the order of 1 gram. Recall that 1 gram of friction was used in the above example where power consumption was estimated, and that for the situation in which the drive system is associated with a portable or laptop computer in which limited power consumption is essential, the 1 gram of steady-state friction was excessive. In other drive system environments, maintaining a low level of frictional losses may not be essential but is still important. Thus the developers of the low friction contact read/write interface of the present invention were faced with a level of friction that was generally untenable, and the realization that the laws of friction that are generally relied upon as a guide for the designer were being violated.

It is evident from this discussion that reducing the pad size and reducing the applied load result in a significant reduction in the friction force. However, there are constraints regarding the amount that pad 48 size and applied load L can be reduced. Regarding pad 48 size, it is important in order to minimize spacing loss between the head and the medium that the magnetic pole structure 50 have a poletip or poletips that are at least nearly in contact with the disk surface 35. Moreover, it is important for certain designs to have more than one pad 48 in sliding contact with the surface 35.

Figure 4:
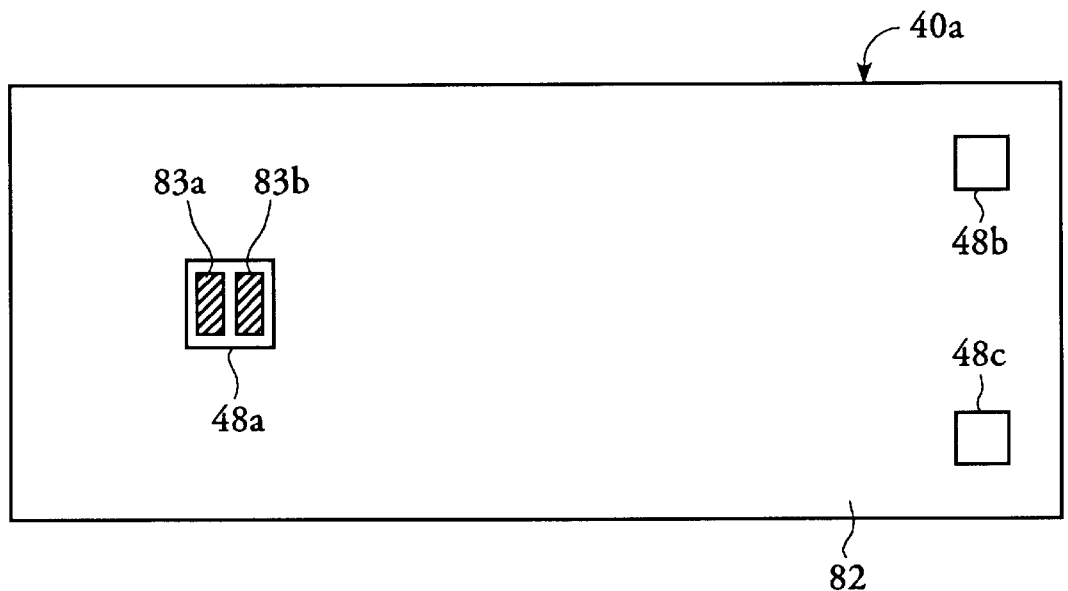
FIG. 4 is a bottom view of a slider having three contact pads, one of which contains a pair of magnetic pole structures.

FIG. 4 shows a slider 40a having a generally flat disk-facing surface 82 with three projecting, spaced apart support pads 48a, 48b and 48c. Pad 48a has a pair of exposed magnetic poletips 83a and 83b for writing to and reading from the recording surface 62, while pads 48b and 48c provide stability and conformance of the slider 40a to the disk surface 35, in concert with a gimbaled attachment, not shown. The area of pad 48a that can easily encompass the poletips of a longitudinal head is currently about 20 μm by 28 μm, although those dimensions are expected to decline over time with improvements in manufacturing techniques. The two magnetically inactive pads 48b and 48c are also generally of similar size so that a lapping process employed for machining the pads 48a, 48b and 48c and operational wear of those pads results in balanced pad heights, although it will be noted below that other pad areas may be preferable. The magnetically inactive pads 48b and 48c are formed preferably of diamond-like-carbon (DLC), as is the wear material surrounding the poletips of pad 48a. Thus a total surface area 66 formed by adding that of pads 48a, 48b and 48c is approximately 1200 μm$^2$.

Assuming that applied load L is the dominant force holding the slider 40a to the disk surface 35, that load L must be sufficient to maintain contact between the slider 40a and disk surface 35 at currently specified industry shock test standards, which require a drive system to withstand a shock of approximately one hundred times the force of gravity (100 G). Thus for a slider 40 having an effective mass of 1 mg, approximately 100 mg of load is required to hold the slider 40 to the surface 35 in the event of a 100 G shock.

Moreover, slider 40 suspensions including a beam 38 and an interposed gimbal encounter a limit at about the same applied load due to fragility of those suspensions used to achieve loads below this level. Using an assumed total nominal pad 48 contact area of 1200 $\mu m^2$ and an applied load of 100 mg, FIG. 3 can be used to estimate the resulting friction force, yielding approximately 600 mg. Thus with this set of assumptions, pad 48 size and applied load L used together are not currently sufficient to reduce the friction force to a level desirable for low power consumption.

To state the problem from a slightly different point of view, a low friction interface could be achieved provided that the cause of the zero-applied-load friction is identified and that a means is found to reduce the zero-applied-load friction to a level close to zero, or at least below 200 mg. It has been discovered in the present invention that the primary cause of the zero-applied-load friction are forces of capillary adhesion. Somewhat similar adhesive forces are believed to be a cause of stiction, for example during CSS of conventional flying heads, although one should note that for a given interface, stiction is typically greater than friction even though the zero-applied-load friction is only a part of the total friction force. The discovery that zero-applied-load friction is due primarily to capillary adhesion has led to the invention of disk surfaces, sliders and interfaces that are optimized for friction reduction.

Figure 5:
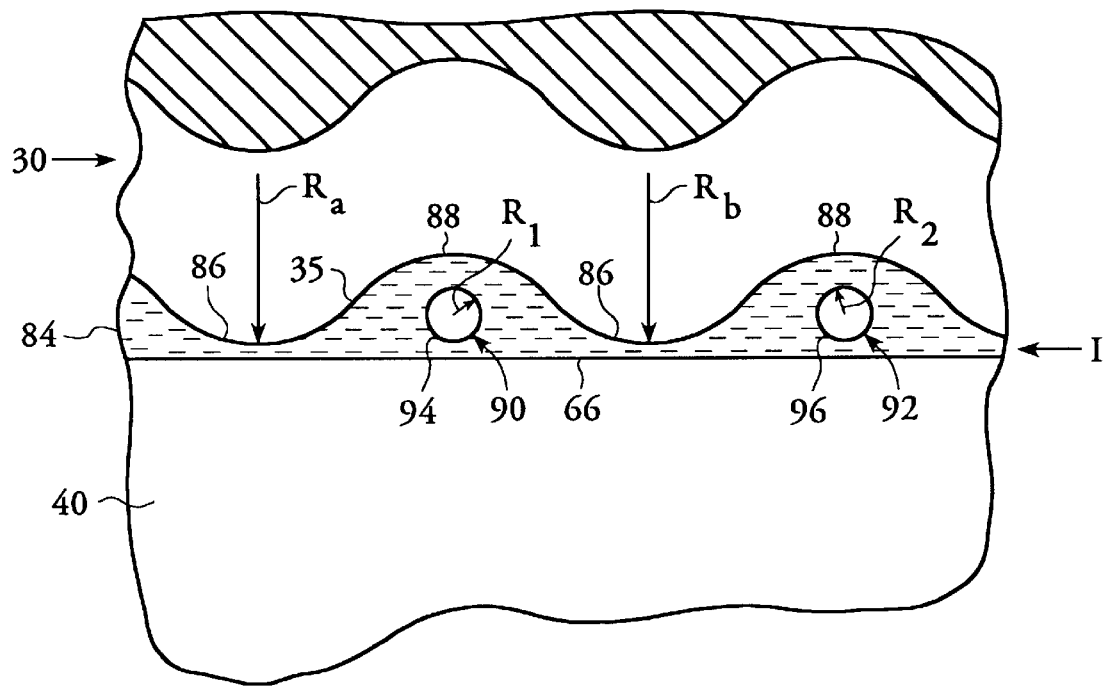
FIG. 5 is a greatly enlarged, inverted, fragmentary, cross-sectional view of the interface of FIG. 2.

FIG. 5 shows a greatly enlarged and simplified view of some elements involved in the contact interface I of the present invention, so that a discussion of means for reducing friction is facilitated. The disk surface 35 is seen to have a number of protrusions 86 with interspaced recesses 88, while the pad surface 66 is relatively flat. The protrusions 86 are characterized by radii of curvature $R_a$ and $R_b$, which, as will be discussed, are preferably within a range of between 2 $\mu$m and 100 $\mu$m for the 1% of the disk surface 35 that is closest to the slider 40. The attractive capillary force $F_c$ between the pad surface 66 and the disk surface 35 is produced by an intervening liquid 84 at the interface. Typically this liquid 84 is predominantly a fluorocarbon or hydrocarbon lubricant such as phosphazene, a trademark of E.I. duPont de Nemours & Co., or Z-Dol, a trademark of Montefluos Co., and which are used to minimize the slider 40 and disk wear that occurs during operation, especially when the slider 40 encounters an asperity on the disk 30. This choice of lubricants is based on their superior lubricating performance, low vapor pressure in the temperature range of 5° C. to 70° C., chemical stability, and low surface energy or surface tension. Air or gas bubbles 90 and 92 have formed due to fluid involution of the liquid 84, with meniscuses 94 and 96 having radiuses of curvature $R_1$ and $R_2$, respectively.

The magnitude of the capillary force $F_c$ is directly related to the interfacial energy $\gamma_i$, which can be estimated if the surface energies of the slider 40, disk 30, and intervening liquid 84 are known. For the liquid 84, determination of the surface energy is straightforward, since it is the equivalent to surface tension, which can be easily measured. For the solid surfaces of the pad 48 and the disk 30, direct measurement is very difficult, but an estimate can be made if the refractive index of the solid is known and if the material is chemically non-polar and non-ionic in composition. The resulting adhesion force is proportional to $\gamma_i$.

A second factor that relates directly to the adhesive force is the area of contact A between the pad surface 66 and the disk surface 35. Again, the adhesion is proportional to the area A of contact. However, this area A is difficult to estimate in practice, because it is not the apparent area of contact, nor is it the real area of contact between the solid slider surface 66 and the solid disk surface 35. Instead, the area A is that area wetted by the intervening liquid such that a substantially direct liquid path of molecular interaction exists between the solid surfaces. For example, the area A would not include that portion of the pad surface 66 opposite air bubbles 90 and 92. Note that this intervening liquid 84 can be a mixture of lubricant and condensed water vapor, especially if the relative humidity of the environment is in excess of 60%.

A general description of the slider-disk adhesion force $F_c$ can be expressed in terms of the Laplace pressure $\gamma/R_m$ and the area of interaction by the following equation:

$$F_c = \gamma_i A / R_m$$

where $g_i$ is the interfacial energy, A is the wetted area of contact, and $R_m$, is the radius of curvature of the liquid meniscus that bridges the slider 40 to the disk. Because the capillary force corresponds with the meniscus radius $R_m$ at the interface, it is referred to as the "meniscus force." $R_m$ can depend upon several factors that include the surface tension of the liquid, the "rest time" (the time the slider 40 rests stationary on the disk before start-up), and the "mean separation" (S; the separation between the mean plane of the disk surface 35 and that of the slider surface 66, where the mean plane is an imaginary plane positioned at a height equal to that obtained by intregrating the various heights within an area dividing by that area).

Note that, as shown in FIG. 5, the relative magnitude of R and the mean separation between the surfaces also affects the wetted area A, such that the wetted area A is generally equal to the nominal area of the surfaces for mean separations less than $R_m$, while the wetted area A decreases dramatically for the case in which the mean separation between the surfaces exceeds $R_m$, allowing air or gas bubbles to form. Three rules can be used as a guide when estimating $R_m$.

First, if the rest time is long as with stiction and the lubricant consists of a free and mobile liquid, $R_m$ is given by:

$$R_m = 6\pi \gamma_l h^3 / H$$

where H is the Hamaker constant for the mobile liquid, $\gamma_l$ is the surface tension (surface energy) of the liquid (not the interfacial energy), and h is the thickness of the liquid layer on the disk. In this case, for a typical disk lubricated with Z-Dol so that $\gamma_l$=23 dyne/cm, h=1.2 nm, H=1×10$^{-19}$J, the meniscus radius becomes approximately 8 nm.

The second rule that can determine the meniscus radius is Kelvin condensation, which occurs when small cracks or gaps are exposed to elevated humidity for extended time periods, such as with stiction. Here the meniscus radius is given by the Kelvin equation:

$$R_k = \gamma V / R_g T \log(p/p_s)$$

where $\gamma$ is the surface tension of water (72 dyne/cm), V is the molar volume of liquid water (18×10$^{-6}$m$^3$), $R_g$ is the molar gas constant (8.314 J/K-mole), T is the temperature in degrees Kelvin (K; assumed to be room temperature of 293 K), and $p/p_s$ is the partial pressure (p) of atmospheric water compared to that pressure at saturation ($p_s$). At 90% RH, which is a standard test condition for disk drive stiction, the Kelvin radius $R_k$ is approximately 12 nm.

The third rule can be applied when the rest time is short and the lubricant thickness is comparable to or thicker than the mean separation S of the planes of the slider contact pad surfaces 66 and the disk surface 35, in which case R can be roughly equated to this mean separation of planes. This rule is important for a pad surface 66 in continuous sliding contact with a disk surface 35, although one should realize that this rule results in a higher level of friction than is actually present for the situation in which the lubricant has not flooded the interface between the pad surface 66 and the disk surface 35, as the wetted area A may in that case be much less than the area of the pad surface 66.

Shifting attention for a moment to the subject of stiction, consider the adhesive force predicted by the second rule for a smooth disk with water flooded on the surface 35 and a slider 40 having a contact pad 48 or pads with a nominal surface area 66 sliding on the disk of 1200 $\mu m^2 = 1.2 \times 10^{-9} m^2$. The Laplace pressure, combined with the meniscus radius of Kelvin condensation (12 mm at 90% RH) leads to an adhesion force of:

$$F_s = (0.072 N/m)(1.2 \times 10^{-9} m^2)/(12 \times 10^{-9} m) = 0.72 \text{ g}$$

Although this level of stiction is not prohibitive, lowering such an adhesion force $F_s$ is advantageous, and may be accomplished either by texturing the disk surface 35 so that the mean separation S is greater than the meniscus radius $R_m$ or the interface must otherwise be prevented from flooding with water, for example by distributing a hydrophobic lubricant on the disk surface 35. As discussed below and with reference to FIG. 9, an inner parking zone 133 of the disk surface 35 may be provided with such a textured surface for stiction reduction, the slider 40 directed to this zone while the drive is turned off. Note that it is also preferable to control the amount of lubricant distributed on the surface, by depositing diluted hydrophobic lubricant along with a solvent which is subsequently evaporated, so that only a small fraction of the interface may be subject to adhesion due to lubricant or condensed water.

Next consider the design of a contact interface of the present invention that leads to low friction due to low zero-applied-load friction. The Laplace pressure of adhesion during sliding can be calculated by assuming that values for several important parameters have been fixed by the manufacturing process, its tolerances, and general system design considerations. These include the contact area of the pad surface 66 (1200 $\mu m^2$), the surface tension of the lubricant (23 dyne/cm), the coefficient of friction $\mu$ (0.3–0.5), the efficiency (e) of the motor (0.5), and the linear velocity v of the disk 30 (10 m/s) with respect to the slider 40. Given these assumptions, a relation between the interface power consumption P and the effective meniscus radius $R_m$ can be derived:

$$P = \mu \gamma_l v A / eR_m = (0.3)(0.023 N/m)(15 m/s)(1.2 \times 10^{-9} m^2)/(0.5) \ R = (2.1 \times 10^{-10} W \cdot m)/R_m$$

Thus for 25 mW of power consumption, the effective meniscus radius $R_m$ is equal to about 8 nm. For worst case design, the entire slider-disk interface may be assumed to be flooded, so that the area A is that of the entire wear pad surface 66, and the plane of the slider and the mean plane of the disk is preferably separated by this 8 nm or more to ensure acceptable power consumption. For the situation in which the entire interface is not flooded, a mean separation of less than 8 nm (perhaps 5 nm to 7 nm) may be acceptable, since the wetted area A would be less than the pad surface 66 area. Also, as mentioned above, a reduction in total pad surface 66 area would also lower the roughness required for this low power consumption. As the separation between the head and the medium layer 58 of the disk 30 increases, unacceptable performance is believed to result for surfaces having a peak to mean plane distance of over about 40 nm. For a disk surface 35 having a gaussian height distribution, such as shown simplistically by a sinusoidal waviness in FIG. 5, an equivalent root-mean-square disk surface 35 roughness Rq must be 1.6 nm or greater, while the constraint of head to medium spacing places an upper limit on that roughness Rq of about 5 nm to 6 nm.

Figure 6:
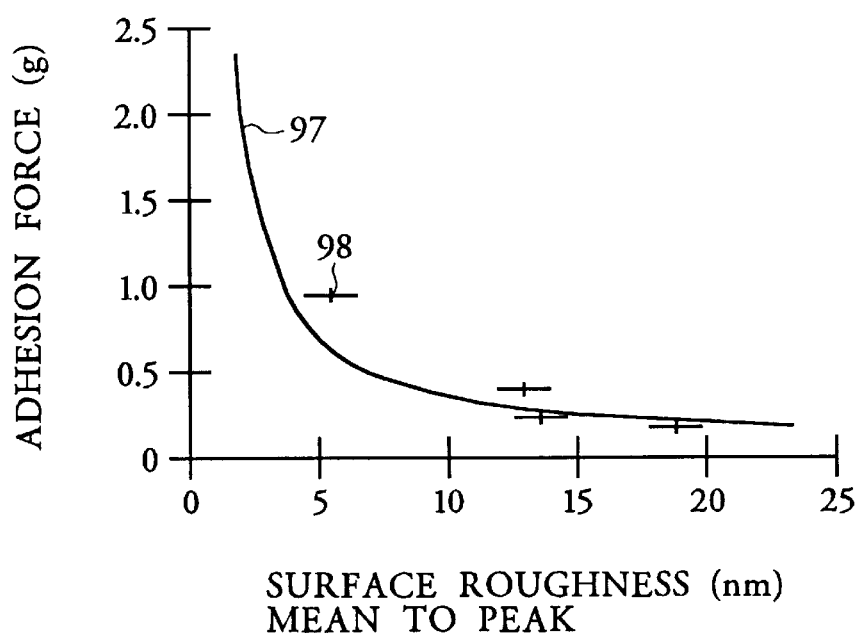
FIG. 6 is a plot of an adhesion force versus surface roughness of an interface of FIG. 5 employing a slider of FIG. 4.

FIG. 6 shows a plot 97 of adhesion force as a function of the disk mean to peak distance, as estimated by five times an average RMS roughness (5δ), as predicted by:

$$F_a = A\gamma_l / R_m$$

where $R_m$ is replaced by the disk mean plane to 5δ plane separation, A is 1200 $\mu m^2$, and $\gamma_l$ is 23 dyne/cm. Also shown are results from experimental measurements 98, where the adhesion force was measured by extrapolating the friction force back to zero applied load and dividing by the coefficient of friction. The disk mean plane to 5δ plane separation was determined by measuring the disk surface RMS roughness by atomic force microscopy (AFM). Remarkably good agreement between theory and experiment can be seen.

Figure 7:
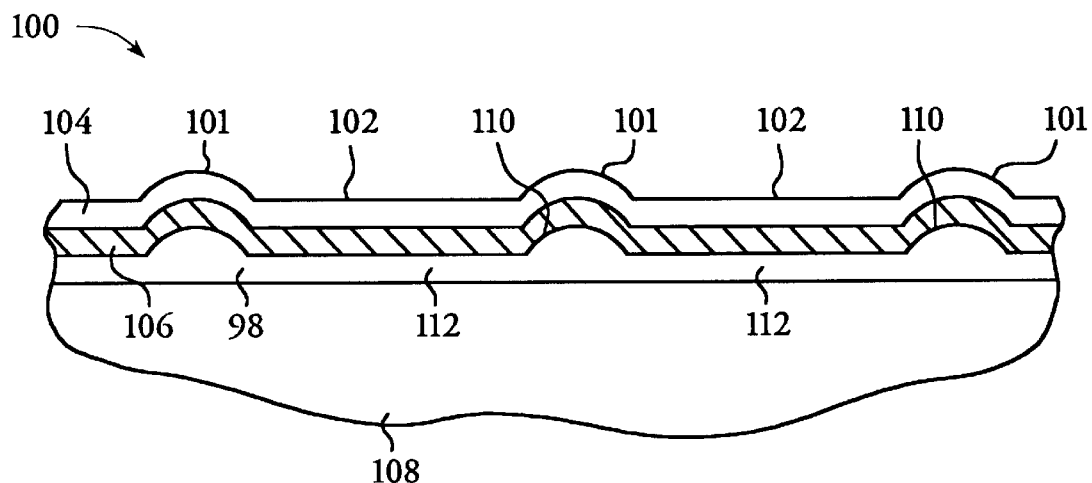
FIG. 7 is a fragmentary cross-sectional view of a non-gaussian disk surface structure of the present invention.

FIG. 7 shows a preferred embodiment of a disk surface 100 having a non-gaussian topography that has been optimized to minimize friction, wear and spacing loss. The surface 100 has an array of protrusions 101 separated by generally flat recesses 102. The protrusions 101 rise semi-spherically above the recesses 102 on a hard protective layer 104 that lies atop a magnetic medium layer 106. The topography of both the magnetic layer 106 and the protective layer 104 substantially reflect that of an underlying texture layer 98 which is formed primarily to provide a preferred topography to the surface 100. In order to obtain a pattern of small, spaced apart, semispherical bumps 110 in the texture layer, that layer 98 is grown atop a substrate 108 that in essence offers a microscopic template for such growth. For instance, one example of the texture layer 98 is formed of amorphous carbon which has been deposited by plasma enhanced chemical vapor deposition, sputtered or otherwise formed atop a single crystal or polycrystalline silicon or silicate substrate 108. Possibly due to the differing molecular bond lengths of carbon as compared to silicon or metal atoms in the silicate, or other irregularities such as microscopic steps on the surface of the silicon substrate 108, the carbon initiates growth in an array of spaced apart nuclei on the silicon, the nuclei growing into the semispherical bumps 110. The remainder of the texture layer 98 begins growing out from the silicon substrate 100 after the bumps 102 have partially grown, yielding substantially flat sections 112 between the bumps 110.

In order to minimize wear caused by irregularities of the disk surface 100, the texture layer 98 is polished so that the bumps 110 are all of substantially equal height before the medium layer 106 is formed. The polishing primarily affects the tops of the bumps 110, causing them to be essentially coplanar and increasing the radius of curvature at each top. After the texture layer 98 is cleaned, the medium layer 106 (which is shown as a single layer for convenience but which may include more than one layer) is formed, substantially retaining the shape of the texture layer 98, with the protective layer 104 then being formed and substantially mirroring the shape of the medium layer 106. Note that the medium layer 106 and the protective layer 104, depending upon the specific formation methods and materials, may have an increased or decreased high frequency roughness compared to the texture layer 98, but still reflect the general shape of the texture layer 98. The protective layer 104 is then buffed or polished in order to remove any high frequency roughness from the tops of the protrusions 101.

It is important, in an environment of substantially continuous dynamic contact between the slider 40 and the disk surface 100, that the tops or peaks of the protrusions 101 are smoothed in order to minimize wear of the slider 40. It is also important for reducing friction, however, that those tops are not too smooth. Surfaces that have been smoothed to have tops with an average radius of curvature above about 100 µm are so smooth that friction is generally too high. As such we have found that constructing the surface 100 to ensure that an average radius of curvature of the upper 1.0% of the surface 100 is greater than 2 µm and less than 100 µm offers both low wear and low friction for a contact communication environment. A more preferable range for average radius of curvature of the upper 1.0% of the surface 100 is between 4 µm and 60 µm, which still offers a considerable window of tolerances for manufacture.

Although the above described method for creating a non-gaussian surface is desirable, other methods for texturing the substrate or underlayer may instead be employed, after which the media layer and overcoat are deposited. For example, an aluminum substrate that has been plated with an approximately 10 µm thick layer of NiFe or NiP can be roughened with an abrasive slurry, such as with a commercially available Speedfam 9B machine, in order to form a series of ridges that rise from interspersed grooves by an average of between 10 nm and 80 nm. Alternatively, such an NiFe or NiP plated aluminum substrate can be textured with a series of small bumps or mounds with a train of high power focussed laser pulses impinging upon the spinning plated substrate. Each laser pulse creates a microscopic spot of molten metal that rapidly resolidifies in the form of a shallow crater surrounded by an annular ridge, thereby creating the desired underlayer texture.

A glass-ceramic composite substrate can be chemically etched in an alkaline solution which etches the glass at a faster rate than the ceramic, so that terminating the etching after a preselected period results in a substrate having a texture of ceramic bumps and glass recesses. Instead of etching a glass-ceramic or glass substrate, a metal film can be deposited thereon using a high vacuum, high temperature evaporation or sputter deposition, so that the film does not wet the substrate. The film in this situation may be an InZn alloy which, due to the partially wetting relationship with the substrate forms minute beads on the substrate surface, the beads then being anchored to the substrate by the subsequent magnetic media and overcoat layers.

The overcoat layer 104 is preferably formed to have a graded hardness, combustibility or wear rate, so that buffing or polishing of the upper reaches of the surface is facilitated, while a harder, less combustible or lower wear lower portion of the overcoat maintains the structural integrity of that layer 104. A preferred method for achieving this graded or stepped wear rate is by sputtering different overcoat materials on a pallet containing a number of disks as that pallet travels from one sputtering chamber to another, the chambers adjoining but separated by baffles. This sputtering typically begins with the formation of a chrome (Cr) seed layer in a first chamber, followed immediately in a second chamber by formation of a media layer or layers, which may include cobalt-platinum-chrome (CoPCr). The formation of the hardest or lowest wear rate portion of the overcoat follows immediately in a third chamber, in which a hydrogenated carbon film is formed by sputtering carbon along with flowing $H_2$, the film having an atomic concentration of about 15% to 30% hydrogen, with a most preferrable atomic concentration of this film being about ⅕ to ¼ hydrogen and about ⅘ to ¾ carbon, respectively. Due to the slower growth rate of the carbon containing overcoat than the metal seed and media layers, a fourth chamber that the pallet passes through has a similar concentration of hydrogen and carbon as the third chamber. A fifth chamber, however, flows $N_2$ while sputtering C to form a softer or higher wear rate outer film of the overcoat layer 104, this outer film having an atomic concentration of about 10% to 30% nitrogen, with a most preferable atomic concentration of this film being about ⅕ nitrogen and about ⅘ carbon. The total overcoat layer that results has a thickness in a range of about 120 to 200 Å, with a minimum 100 Å of that thickness being the harder hydrogenated carbon and a minimum 20 Å of that layer being the softer nitrogenated carbon. In essence, this overcoat 104 provides a "buff-stop" layer for polishing of a textured surface, resulting in favorable mechanical and chemical characteristics for reduced friction and better wear.

After formation of a media layer and a carbon containing overcoat atop an underlying texture which has been produced by one of the techniques mentioned above to produce overcoat protrusions having desired heights of many nm, rounding of the protrusions to achieve radii of curvature of the protrusion tops that average between 2 µm and 100 µm can be carried out by a procedure termed "kiss-buffing" or simply "buffing". To employ this kiss-buffing procedure, we employ a customized hard disk drive finishing machine (EDC Series 800 HDF, model C) made by Exclusive Design Company, Inc. Using this machine, each disk is mounted via gripping at an open inner diameter, onto the end of a power driven rotary spindle of the machine, so that the disk is disposed to spin between a pair of opposed rubber rolls each of which is trained with an abrasive tape. During buffing, the tape covered rolls clamp the disk under high pressure, and while the spindle rotates the disk at about 1800 rpm the tape covered rolls move the tape in a counter rotative direction at a linear speed in a range between 300 and 400 mm/min, while rubbing the disk. The tapes are pressed against the disk under a load within the range of about 450 g to 700 g, and preferably about 550 g, for a time period within a range of 5 s to 90 s, and preferably around 20 s to 30 s. The normal pressure on the disk in an area at which the tape rubs is about 20–30 g/mm$^2$. On average, this kiss-buffing procedure removes a depth of overcoat material that is substantially greater at the tops of protrusions than in the recesses, resulting in the desired rounding of the tops.

Following kiss-buffing each disk is cleaned beginning with, typically, a 12 min cycle in a megasonic cleaner operating at 760 Khz, and employing 0.1% Oakite NST detergent, followed by a deionized water rinse and a soak in a hot water tank at about 130° F. and then clean air drying.

The resulting protrusions in a preferred embodiment rise between about 8 nm and 100 nm from the interspaced recesses 102, and may be spaced apart from each other a distance ranging from 50 nm to 1 µm. The height of the protrusions represents a compromise between friction reduction and increased magnetic spacing, for which a most preferable tradeoff appears to occur where the mean to peak height of the protrusions is in a range between about 5 nm and 20 nm. A characteristic of the surface 100 that is important for wear minimization is that the highest 1.0% of the surface 100 is coplanar to within about 3.0 nm over a 100 µm square area.

The average radius of curvature of the asperity peaks is calculated by obtaining atomic force microscopy (AFM) data on a portion of the disk surface, typically a 10 µm by 10 µm generally square area, and clipping that data to look only at data regarding that portion of the surface between the 99.00% (cumulative) height level and the 99.99% height level. The upper clipping boundary is used to exclude from consideration data which may not be statistically representative of a sample surface, i.e., noise. Individual radii of curvature are calculated along each of typically 512 AFM scan lines for those peaks where at least three consecutive points lie above the 99.00% height level For each such set of three points a radius of curvature of the peaks $R_p$ is calculated using the formula:

$$R_p = d^2/8m$$

where d is the distance between the first and third of those three points and m is a distance between the second point and a point located on the midpoint of a line connecting the first and third points. The average radius of curvature is then calculated by averaging the reciprocals of each of the individual values, and then taking the reciprocal of that averaged quantity.

Note that the topography of the surface 100 has been tailored to optimize the somewhat conflicting requirements of low friction, low wear of the slider 40, and minimal spacing between the head and the medium for a hard disk drive system operating in substantially continuous sliding contact. The low friction requirement has been satisfied by the spacing afforded between the mean plane of the surface 100, which is near the level of the recesses 102, and that of the pad surface 66, not shown in FIG. 7 but which would be disposed near the tops of the protrusions 101. Reduction of friction is also accomplished by the small but appreciable curvature of the tops of protrusions 101, and by the minimal amount of surface area represented by the tops of protrusions 101 that are adjacent to the pad surface 66, which substantially reduces adhesive forces between the pad and disk surfaces. The low wear requirement has been minimized by the buffing or polishing of the tops of the protrusions, as irregularities in the upper reaches of a disk surface 100 are thought to be a primary cause of wear of the slider 40 that contacts the surface 100. The low head-medium spacing requirement has been achieved by providing a texture to the medium layer 106 that substantially reflects that of the surface 100, so that the medium layer 106 is everywhere spaced from the surface 100 by a minimal amount required to maintain the thin protective coating 104 which is needed for avoiding wear or damage to the surface and corrosion of the medium layer 106. The minimal head-medium spacing is also facilitated by the step of polishing the texture layer 98, which allows the subsequent buffing of the protective coating 104 necessary for reduced wear to remove less of the coating 104, thereby allowing the coating to be thinner and the spacing less.

Referring again to FIG. 3, the curves 72, 76 and 80 of that figure can be interpreted as showing that in addition to the applied load there is a second contribution to total load which is believed to arise from a capillary adhesive force. Thus, the friction force $F_f$ can be expressed in the present invention as follows:

$$F_f = \mu(F_c + L)$$

where $\mu$ is the friction coefficient, $F_c$ is the capillary adhesive load, and L is the applied load. The adhesive friction force $F_z$ can be estimated by multiplying the adhesion force $F_c$ by the coefficient of friction $\mu$ between the head and the disk:

$$F_z = \mu F_c$$

Thus, in the embodiment disclosed above, a specifically textured disk surface 100 was employed to reduce the friction between that surface 100 and a pad surface 66 by reducing the adhesive friction force $F_z$. A somewhat independent means for reducing adhesive friction force $F_z$ in a continuously sliding hard disk drive can be accomplished by reducing the nominal area of the pad surface 66. Consider again FIG. 3, where the friction force is shown vs. the applied load with the pad size as a parameter. Recall that Amontons' Laws predict that friction force is independent of nominal pad surface area 66. If $F_c$ is assumed to be a linear function of the pad area $F_c = \gamma A/R_m$, the expression for $F_f$ can be expanded as:

$$F_f = \mu[(\gamma A/R_m) + L]$$

or $$F_f/A = \mu[(\gamma/R_m) + L/A]$$

Figure 8:
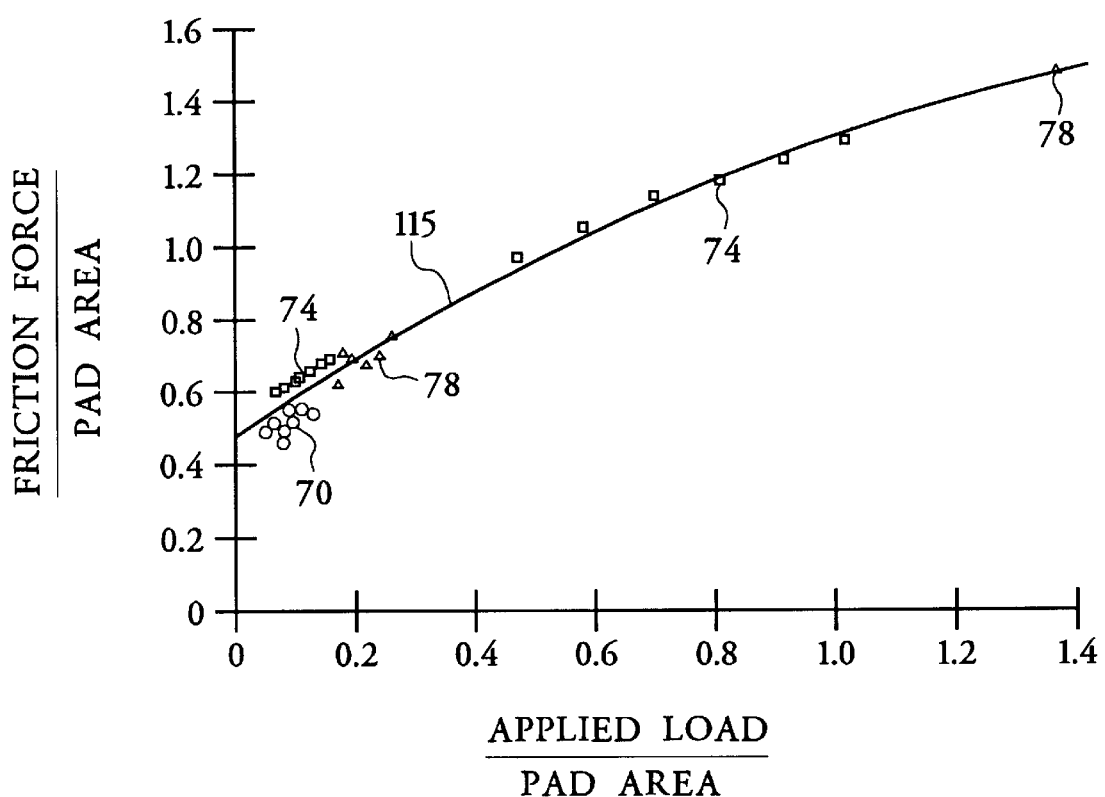
FIG. 8 is a plot of the relationship between frictional force and applied load of the present invention, as normalized by pad area.

Thus a plot of $F_f/A$ vs. L/A should produce a single curve where all three of the pad size curves in FIG. 3 have converged upon one another in a straight line. Such a plot is shown in FIG. 8, where indeed a single curve 115 which is approximately straight is achieved.

The limits on pad surface 66 size can now be calculated for a smooth disk of roughness 0.5 nm RMS with the interface flooded with lubricant. Recall that for 4 interfaces at 10 m/sec with a 50% efficient spindle motor, the maximum allowable friction force $F_f$ per interface for low power consumption is roughly 100 mg. If a coefficient of friction $\mu$ of 0.3 is realized, the total load $(F_c+L)$ cannot exceed 300 mg. Manufacturing limitations have in the past restricted the minimum achievable applied load L to approximately 100 mg, thus leaving about 200 mg for adhesive loading. For a lubricant of surface tension equal to 23 dyne/cm and a roughness of 0.5 nm RMS (equivalent to a mean-plane-to-peak separation of about 2.5 nm) the maximum total pad size is calculated to be: $(200 \text{ mg})(1 \times 10^{-6} \text{ kg/mg})(9.8 \text{ m/sec}^2)(2 \times 10^{-9} \text{ m})/(0.023 \text{ Newton/m}) = 1.7 \times 10^{-10} \text{ m}^2 = 170 \text{ } \mu\text{m}^2$. For a three-pad slider 40a, each pad 48a, 48b and 48c would need to be only 5 $\mu$m in diameter.

As mentioned above, it is difficult to manufacture such a small pad 48a which encompasses a pair of magnetic poletips 83a and 83b for longitudinal writing and reading with a medium. Such a pad size is easier to accomplish for a pad 48 that encompasses a single magnetic pole for perpendicular communication, or the situation in which a single pad 48 rather than three pads 48a, 48b and 48c contact the disk surface 35. It is also possible to reduce the size of the non-magnetically active pads 48b and 48c compared to that of the magnetically active pad 48a, so that the total area in nominal contact with the surface is greatly reduced. Moreover, as will be described in more detail below, the pad or pads can be made to include a partially wetting material, thereby substantially reducing the adhesive force. Further, at least magnetically inactive pads 48b and 48c can be patterned with deep grooves on their disk-facing areas for reduced adhesion, or may have a tapered or tailored thickness for structural integrity yet reduced nominal area of contact. Such pads 48b and 48c are also typically made of a material such as diamond-like-carbon (DLC) that is harder overall than that of pad 48a, which includes a much softer magnetically active material such as nickel iron (NiFe) permalloy, so the pads 48b and 48c are each preferably thinner than pad 48a for uniform wear. Given the above modifications, the total pad surface area 66 facing the disk surface 35 can be greater, and may be in the range of between 1000 $\mu$m$^2$ and 3000 $\mu$m$^2$, although preferably less than 2000 $\mu$m$^2$.

Assuming the limit of a flooded interface, the above discussion suggests that there is a critical pad surface 66 area to disk surface 35 roughness ratio, below which acceptable friction levels are realized, for the present assumption that the pad contact area is relatively smooth and wetting. For example, a pad area 66 to disk roughness ratio of 340 $\mu m^2/nm$ and lower is desirable for low friction-caused power consumption, such as for a portable computer, while levels up to about 400 $\mu m^2/nm$ are tolerable. A convenient way of expressing this relationship is in terms of a dimensionless aspect ratio using mean-squared (MS) surface roughness rather than root-mean-squared (RMS) surface roughness. In this context, a low friction interface is characterized by an aspect ratio of pad nominal contact area to MS roughness equal to or less than about $1.6 \times 10^8$. For example, an interface that works well for minimizing friction has a pad area of 1000 $\mu m^2$ and a MS roughness of 9 $nm^2$.

Another way of expressing the relationship for a desired level of friction between the pad surface 66 area and disk surface roughness is that, for a disk surface 35 having numerous microscopic asperities, the height of those asperities must be greater for a greater pad surface 66 area. For example, a ratio of pad surface area 66 to asperity height from a mean plane of less than 1000 $\mu m^2/10$ mn or less than 0.1 m will yield a very low level of friction, while such an area-to-height ratio of less than 0.3 m will likely result in a tolerable level of friction. Another way of expressing this low friction condition is in terms of an aspect ratio of the square root of the pad contact area to the mean-to-peak asperity height, which can be envisioned as a "width-to-height" aspect ratio. In these terms, a low friction condition can be achieved with a width-to-height aspect ratio of less than or equal to around 5,000.

With the employment of more efficient spindle motors or higher capacity batteries, this ratio can be relaxed accordingly. Also note that lower surface tension or lower viscosity lubricants could relax this ratio, but such lubricants are not in common use today. Other factors that can achieve a low friction operating condition with larger aspect ratios include providing self-roughening, deeply textured or partially wetting or non-wetting pads, as will be discussed in more detail below. The number of interfaces in a drive and maximum linear velocity of the interface also are factors that contribute to this ratio. Therefore, the ratios given here are representative examples of the general tradeoff between pad surface 66 area and disk surface 35 roughness for wear pads having generally smooth disk-contact surfaces formed primarily of DLC.

For very rough surfaces, where the interface is not flooded, these ratios would naively predict that any pad surface 66 area could be used. This is not the case on closer examination, because as discussed above, that area A of the interface that is wetted will still contribute to the adhesion force. Moreover, as is also mentioned above, a very rough surface causes the head-medium spacing to be excessive when the peak to valley height exceeds about 100 nm.

Figure 9:
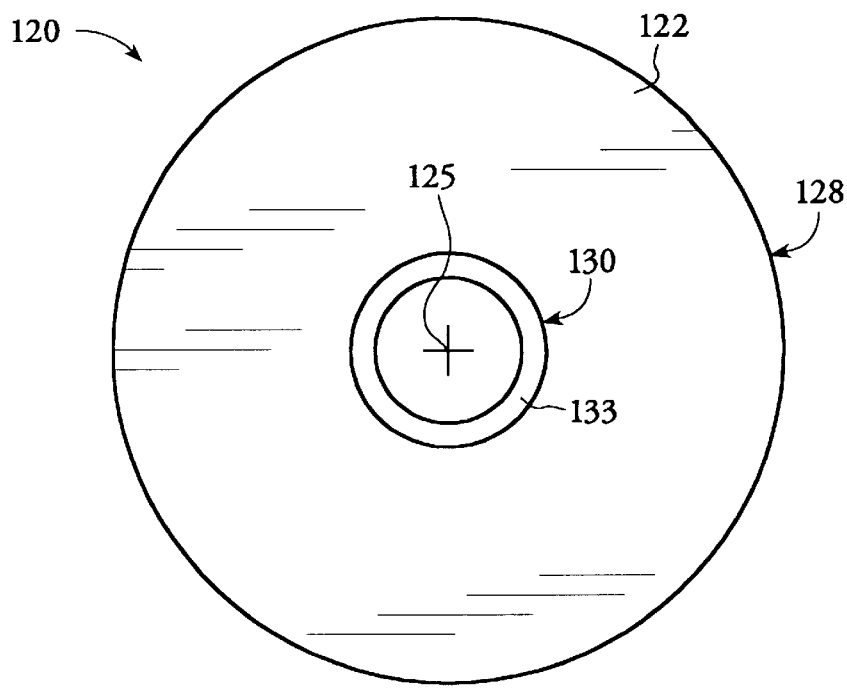
FIG. 9 is a top view of a disk of the present invention having a radially graded roughness.

FIG. 9 shows an embodiment of the present invention in which a disk 120 has a surface 122 with a roughness that generally increases with distance from a geometric center 125 of the disk, although on the scale shown in this figure the surface appears uniformly smooth. Since the power lost to friction is generally proportional to the speed of the slider 40 relative to the disk 30, and a disk rotating at a set angular velocity has a greater speed at an outer diameter (OD) 128 than at an inner diameter (OD) 130, the greater roughness at the OD compensates for the greater speed in order to maintain energy dissipation below a given level regardless of the radial location of the slider 40 on the disk surface 122. Since the speed of the disk surface 122 for given angular velocity is proportional to the distance from the center, the roughness of the surface may also be substantially proportional to that distance. Note that the increased spacing resulting from a larger mean to peak distance corresponding to the higher roughness near the OD is compensated by the increased signal amplitude obtained as the linear velocity increases.

It may be desirable, in addition to this radially graded roughness, to have an annular inner area 133 of the disk surface that is very rough in order to provide a parking area with reduced stiction. Such a parking area 133 may be rougher than the surface 122 at the OD 128. One should note that the transition between the minimal roughness found at the ID 130 and the greater roughness of the parking area 133 should be smooth rather than abrupt. For instance, a two and one-half inch disk may have a parking area 133 with an RMS roughness of about 5 nm, which decreases to a roughness of about 1.5 nm at the ID 130 and then radially increases to a roughness of about 3 nm at the OD.

Perhaps the easiest and most cost effective method for producing the radially varying disk surface 35 roughness is the use of a relatively course abrasive tape on the substrate 52 or underlying texture layer 54, with the tape rubbing in a generally circumferential direction opposite the motion of the spinning disk substrate. A graded pressure can be applied to the tape that is greater closer to the OD than the ID, with the possible exception of a high applied pressure at a parking area near the ID. Alternatively or in addition, the tape or other abrasive body such as a lapping plate can itself have a graded roughness, and may comprise an abrasive disk or pair of disks that sandwich the substrate 52 and spin oppositely to the substrate 52 or layer 54 being textured. In order to produce primarily radially oriented grooves and ridges, instead of the primarily circumferentially oriented grooves and ridges that result from the above processes, one may run a tape having a width less than the diameter of the disk rapidly across a diameter intersecting the center of the substrate 52 or texture layer 54 while the disk turns slowly. As with the other methods discussed for producing a textured disk surface, it is important to kiss-buff the surface 35 under high pressure with a tape that is much smoother than the abrasive tape employed for texturing the substrate 52 or the texture layer 54, in order to produce a surface 35 having asperities that rise many nanometers above interspersed recesses, with an highest one percent of the surface having a radius of curvature Rp in a range between 2 $\mu m$ and 100 $\mu m$. This kiss-buffing is preferably accomplished with a tape at a pressure in a range between about 30 $g/mm^2$ and 100 $g/mm^2$, for a time period in a range of 5 seconds to 90 seconds.

Because the friction force $F_f$ is proportional to the sum of the adhesive load $F_c$ and the applied load L, both load factors must be minimized. The preceding discussion has centered on minimizing the capillary adhesive component of the load. However, on rough surfaces designed to reduce the adhesive component of the load, the net friction force $F_f$ is not zero even though the adhesive load $F_c$ is negligible. For example, given a coefficient of friction of 0.3 and a maximum desired friction force of 100 mg, the maximum load that can be employed is 300 mg. If adhesive loads are present, then the applied load must be reduced to keep the friction below 100 mg.

Note also that a maximum total load of 300 mg can be translated into an effective mass of the slider, since it is necessary to apply a load to the slider to keep it in contact with the disk, which is not ideally flat. Long and short range waviness in the disk and industry shock test specifications require that the slider conform to the disk despite a shock of 100 G. Thus, the maximum effective mass of a slider should not exceed 3 mg if friction is to held within necessary limits and the slider is to be held in compliance with the disk, and a slider having a reduced mass is generally better for friction reduction.

Additionally, the friction force $F_f$ can be minimized by designing the slider support structures that slide on the disk to be roughened, which has a similar effect on friction as that described above for a roughened disk surface. Such support structures, for example pads 48a, 48b and 48c, must allow for wear, which over the lifetime of the drive may remove a micron or more of pad height. Since this amount of wear exceeds the peak to valley height of any of the textured surfaces discussed so far, the pad or pads must be roughened by a process that yields deep grooves, which preferably have a height to width aspect ratio exceeding one. Means for achieving such high aspect ratio grooves is via laser ablation or focussed ion beam etching.

Alternatively, the material forming the support structure can be optimized for reduced friction, once again keeping in mind the requirement that, since a certain amount of wear must be tolerated, the low-friction material must permeate more than a surface coating. Since the amount of wetted area A has a dramatic effect on the adhesive load $F_c$, having a partially wetting surface within the contact interface offers a reduced frictional force $F_f$. Unfortunately, having a disk surface that is partially wetting would interfere with lubricant retention, thereby increasing wear. The use of a partially wetting surface for slider wear pads 48a, 48b and 48c, however, offers a dramatic reduction in the wetted area A without a concomitant increase in wear. Generally, a hard, partially wetting material suitable for a wear pad can be formed of an amorphous hydrogenated carbon or halogenated carbon. In particular, an amorphous fluorinated carbon has been found to be especially partially wetting, and to offer a significant friction reduction that is believed to result from reduced adhesive friction.

Figure 10:
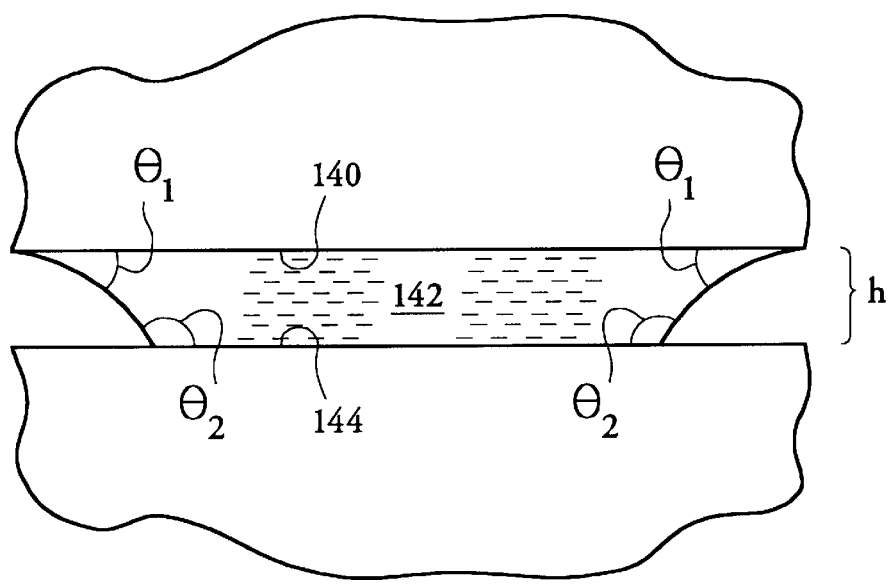
FIG. 10 is a cross-sectional view of a lubricant interacting with a wetting and a partially wetting surface.

The partially wetting nature of the wear pad material is illustrated in FIG. 10, which shows an interface between a smooth wetting surface 140, a lubricant 142 and a smooth partially wetting surface 144, where the partially wetting surface 144 corresponds to a slider surface and the wetting surface 140 represents a disk surface, although as discussed above, either or both of these may be rough rather than smooth. A meniscus angle $\theta_1$ between the lubricant 142 and the wetting surface 140 can be seen to be small, approaching 0°, while such a meniscus angle $\theta_2$ between the lubricant 142 and the partially wetting surface 144 can be seen to be much greater, preferably 90° to 100°. Thus the partially wetting surface 144 reduces the area A which is wetted, an effect which is dramatically increased as the lubricant thickness h between the surfaces is reduced. The adhesive friction force Fz can be written to include the effect of the meniscus angles $\theta_1$ and $\theta_2$ as:

$$F_z = \mu F_c = A\gamma_l(\cos\theta_1 + \cos\theta_2)/h$$

Note from this equation that, if one of the surfaces is partially wetting to the extent that $\theta_1 + \theta_2 = 180°$, the adhesive friction force $F_z$ theoretically disappears. For certain applications it may be desirable for one of the surfaces to be partially wetting such that $\theta_1 + \theta_2 > 180°$, indicating repulsion rather than adhesion, which must be balanced by an applied load L that maintains contact between the disk and the slider 40.

Such a partially wetting wear pad is preferably formed in a low stress manner by cold cathode, plasma enhanced chemical vapor deposition (PECVD). A DLC material including a substantial molar fraction of hydrogen can be deposited in a PECVD planar powered electrode reactor by flowing a gaseous hydrocarbon source, preferably toluene ($C_6H_5CH_3$) on a sputtered silicon (Si) film which serves as an adhesion promoter. After a sufficient DLC film has formed, the individual wear pad or pads can be formed by reactive ion etching with an oxygen ($O_2$) plasma via a metal mask defined by photolithography and ion beam etching. The partially wetting property of the wear pad can be enhanced by doping the DLC during growth with fluorine, such as by flowing a fluorine containing gas (e.g., $CF_4$, $NF_3$ or $C_2F_4$) at a flow rate approximately one-half that of the hydrocarbon source and a working pressure in a range between about 50 and 100mTorr.

Figure 11:
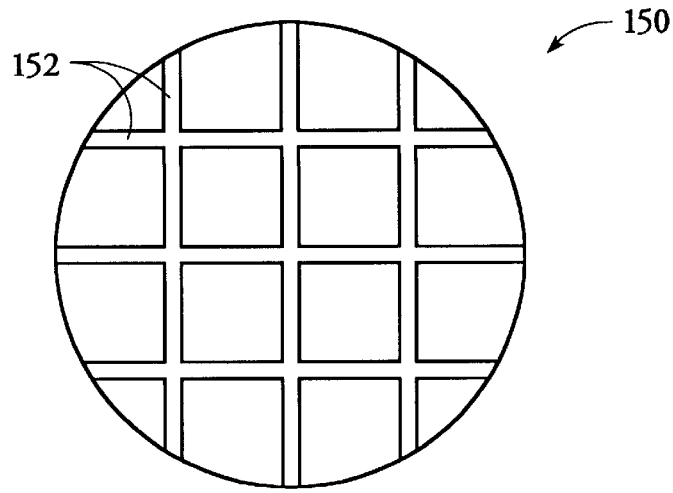
FIG. 11 is a bottom view of a support pad having a cross-hatched disk-facing pattern of grooves.

FIG. 11 shows a magnetically inactive wear pad 150 which has been constructed of a hard amorphous material such as DLC with cross-hatched grooves 152, the grooves reducing the area of the pad in nominal contact with a disk surface and thereby lowering capillary adhesion. The grooves 152 have a width of about 1 $\mu$m in this embodiment, although greater or smaller groove widths may be desired. In order to allow for eventual wear of the pad 150, the grooves should have a depth of at least 2 $\mu$m. Such narrow, deep grooves can be fabricated by laser or ion beam ablation. For example, a low power laser etching machine, such as is available from New Wave Research Co., 1283 Old Mountain View Rd, Suite E, Sunnyvale, Calif., can be employed for this purpose. The depth and width of the grooves 152 can be controlled by adjusting laser power and exposure time.

Figure 12:
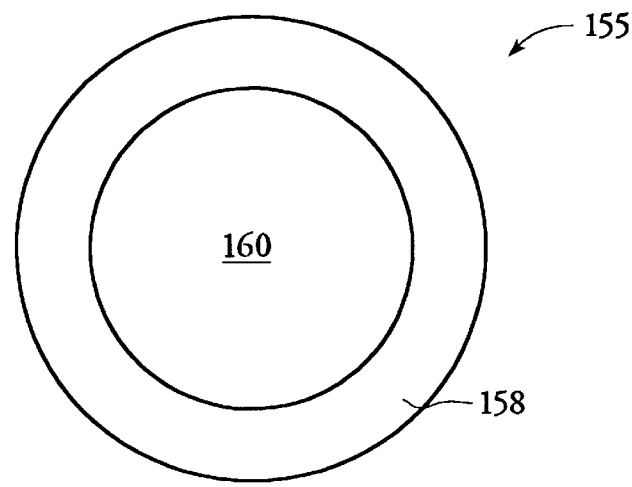
FIG. 12 is a bottom view of a support pad having a disk-facing pattern of apertures.

FIG. 12 shows another magnetically inactive wear pad 155 that has been etched to leave an annular ridge 158 and a recessed central portion 160. This annular formation can be accomplished by employing a circular photoresist mask with a central hole and ion beam etching. The ridge 158 extends above the recessed area 160 by between 2 $\mu$m and 5 $\mu$m while extending above the disk-facing surface of the slider, not shown, by 4 $\mu$m to 10 $\mu$m. The diameter of wear pad 155 may range between 5 $\mu$m and 50 $\mu$m. Alternatively, FIG. 12 can represent a magnetically inactive wear pad 155 that has been formed with an inner column of high wear rate material 160, such as DLC having either a high combustibility or relative softness, as compared to a lower wear rate material 158, such as DLC having a higher hardness or resistance to combustion, which encompasses the high wear rate material 160. Over time the high wear rate inner column 160 loses more material than the surrounding low wear rate material 158, causing a recessed central portion and an annular ridge, lowering the area of the wear pad 155 sliding on the disk and the frictional force, while maintaining the structural integrity of the wear pad.

Figure 13:
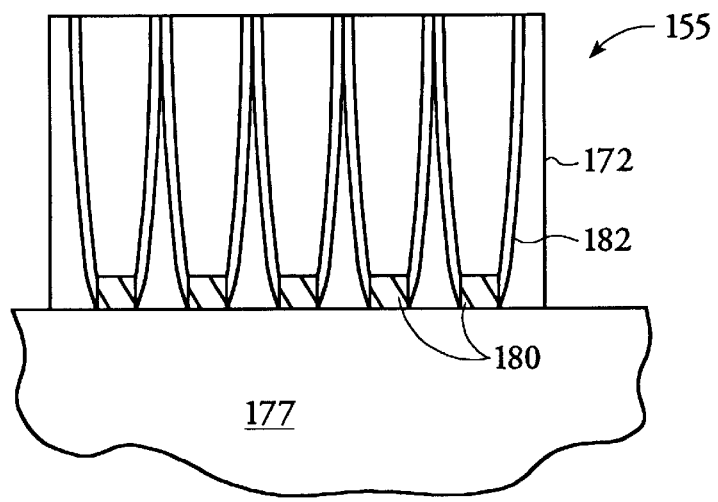
FIG. 13 is a cross-sectional view of a magnetically inactive support pad formed with portions which wear at differential rates in order to maintain a roughened pad surface area over time.

FIG. 13 shows a portion of a disk facing surface of a slider 170 including a magnetically inactive wear pad 172 which has been formed to produce a self-roughening disk contacting surface 175, thereby offering a lasting reduction in friction as the pad wears. While a specific example of a means for making this structure is shown in this figure, note that other construction methods are also possible for creating a substance having interspersed high and low wear rate regions. In order to construct this pad 172 on a slider body 177 a plurality of spaced apart bumps 180 are first formed by any convenient method, to provide an inhomogenous template in order to create imperfections in the wear pad 172 that cause differential rates of wear of that pad. As an example, the bumps 180 may be formed by a process which involves first sputtering a metallic seed layer such as NiFe to perhaps 1000 Å, then patterning a photoresist to expose portions of that seed layer where the bumps 180 are desired, then electroplating a metal layer which may also be of NiFe, followed by stripping the resist and then ion beam etching to remove the interspersed seed layer and to form an array of somewhat cubical bumps 180 having a height in a range between about 0.5 $\mu$m and 1.0 $\mu$m. On and around the bumps 180 a layer of DLC is formed and, due to different growth directions atop and between as compared with around the bumps, a number of regions 182 develop along which DLC having growth directions are formed, the differing growth directions having generally different mechanical properties including differential wear rates. Thus, when the pad 180 is employed in continuous sliding on a disk, the regions 182 wear at a faster rate than the remainder of the DLC wear pad, resulting in a self-roughening pad with reduced capillary adhesion and lower friction.

We claim:

1. A transducer-media interface for an information storage system, comprising a rigid body having a magnetic medium layer and an overcoat layer adjoining said medium layer, said overcoat layer having a surface, said surface having a microscopic texture characterized by a root-mean-square roughness in a range between two and five nanometers, and a plurality of asperities having an average radius of curvature, in the highest one percent of said surface, of between two microns and one-hundred microns, and a transducer-bearing structure in a sliding relationship with said surface and a communicative relationship with said medium, said structure having an area intimately facing said surface and measured in square microns that is less than four hundred times as great as said root-mean-square roughness expressed in units of nanometers.

2. The interface of claim 1, wherein a portion of said transducer is encased by said structure and intimately faces said surface.

3. The interface of claim 1, wherein said structure includes three spaced apart pads, wherein at least one of said pads has a sliding relationship with said surface.

4. The interface of claim 1, and further comprising a lubricant disposed on said surface.

5. The interface of claim 4, wherein said structure has a partially wetting relationship with said lubricant.

6. A transducer-media interface for an information storage system, comprising a body having a first outermost surface and a second outermost surface with a magnetic medium layer disposed between said surface adjacent said first surface, said first surface characterized by at least several microscopic protrusions and interspaced recesses within a 100 square micron area, said protrusions having a height of between 4 and 60 nanometers from a mean level of said first surface and having tops, disposed within the highest one percent of said first surface, with an average radius of curvature of between two and one-hundred microns, and a transducer bearing structure in a sliding relationship with said first surface and a communicative relationship with said medium, said structure having an area intimately facing said first surface such that a ratio of said area to said height is less than 0.3 meters.

7. The interface of claim 6, and further comprising a lubricant disposed on said first surface, said lubricant having a partially wetting relationship with said structure.

8. The interface of claim 6, and further comprising a lubricant disposed on said first surface, said lubricant having an effective meniscus radius less than said height.

9. The interface of claim 6, wherein most of said structure contains a plurality of voids.

10. The interface of claim 6, wherein most of said structure includes regions of a first material interspersed within a second material, wherein said first material has a first wear rate and said second material has a second wear rate, said first wear rate being substantially different from said second wear rate.

11. The interface of claim 6, wherein said structure includes three spaced apart pads, one of said pads including a portion of said transducer.

12. An information storage system comprising a rigid disk having a first and a second surface, with a magnetic medium layer disposed adjacent to said first surface, said first surface characterized as being macroscopically smooth and microscopically textured, and including a plurality of asperities having tops disposed in the highest one percent of said first surface, said tops each having a radius of curvature of at least two microns, a transducer in a communicative relationship with said medium layer, and a structure supporting said transducer in a sliding relationship with said first surface, said structure having an area engaged in said sliding relationship that is less than approximately 2000 square microns.

13. The system of claim 12 wherein said area engaged in said sliding relationship includes a portion of said transducer.

14. The system of claim 12, wherein said structure includes three spaced apart pads, one of said pads including a portion of said transducer.

15. The system of claim 12, wherein said first surface includes a lubricant and said structure includes more than a coating of a partially wetting material.

16. The system of claim 12, wherein said structure has a pattern of grooves intimately facing said first surface.

17. The system of claim 12, wherein said structure has a pattern of differential wear rates intimately facing said first surface.

18. A hard disk drive system comprising a rigid information storage disk having a magnetic medium layer and an adjoining surface layer with a roughness, a lubricant disposed on said surface layer, a transducer disposed in a communicative relationship with said medium, and a support structure attached to said transducer and disposed in a sliding relationship with said surface layer, said support structure including a partially wetting material having a thickness of at least one-half micron in a direction normal to said disk surface layer, whereby said support structure has a durable reduced capillary adhesion to said surface layer.

19. An information storage system comprising a rigid disk including a magnetic media layer adjoining a coating layer having a surface with a plurality of microscopic asperities, said asperities having a mean-to-peak height in a range between about 6 nm and 50 nm and having an average radius of curvature in a range between about 2 $\mu$m and 100 $\mu$m in a highest one percent of said surface, said surface having an root-mean-square roughness between about 1.5 nm and 5.5 nm, and a slider having an area nominally contacting said disk, wherein a ratio between said nominal area of contact and said mean-to-peak height is less than 0.3 m.

* * * * *